US012632301B2

(12) United States Patent
Jain et al.

(10) Patent No.: US 12,632,301 B2
(45) Date of Patent: May 19, 2026

(54) DATA PROCESSING ACROSS APPLICATIONS IN CLOUD ENVIRONMENTS

(71) Applicant: Citibank, N.A., New York, NY (US)

(72) Inventors: Hansraj Jain, Chennai (IN); Ma Jun, Shanghai (CN); Rajagopalan Premkumar, The Springbloom (SG); Vidyalakshmi Pathai Ramakrishnan, Chennai (IN)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 18/607,953

(22) Filed: Mar. 18, 2024

(65) Prior Publication Data

US 2025/0147805 A1 May 8, 2025

Related U.S. Application Data

(63) Continuation of application No. 18/503,555, filed on Nov. 7, 2023, now Pat. No. 11,934,879.

(51) Int. Cl.
G06F 9/50 (2006.01)

(52) U.S. Cl.
CPC .......... G06F 9/5016 (2013.01); G06F 9/5072 (2013.01)

(58) Field of Classification Search
None
See application file for complete search history.

(56) References Cited

U.S. PATENT DOCUMENTS

| | | | |
|---|---|---|---|
| 10,659,434 B1 | 5/2020 | Kim et al. | |
| 11,522,795 B1 | 12/2022 | Lohiya et al. | |
| 2014/0237137 A1 | 8/2014 | Ervin et al. | |
| 2016/0006656 A1 | 1/2016 | Yan | |
| 2017/0005897 A1 | 1/2017 | Mital et al. | |
| 2020/0073991 A1 | 3/2020 | Reeve et al. | |
| 2024/0045714 A1* | 2/2024 | Peng ...................... G06F 9/546 |

OTHER PUBLICATIONS

International Search Report on PCT/US24/46994 Dtd Dec. 3, 2024.

* cited by examiner

*Primary Examiner* — Eric C Wai
(74) *Attorney, Agent, or Firm* — Foley & Lardner LLP

(57) ABSTRACT

Presented herein are system and methods for handling processing of data in cloud environments. A server receives a first dataset generated in response to a function of a first application. A server generates a set of identifiers defining a sequence of processing of the first dataset associated with the function. The identifiers include a first identifier indicating the first application as a predecessor for the first dataset and a second identifier indicating a second application as a successor for the first dataset. The server identifies the second application corresponding to the second identifier as the successor for processing the first dataset. The server communicates at least a portion of the first dataset with a second server hosting the second application to receive a second dataset generated by the second application. The server stores the second dataset in the cloud environment.

20 Claims, 5 Drawing Sheets

DATA PROCESSING ACROSS APPLICATIONS IN CLOUD ENVIRONMENTS

CROSS REFERENCE TO RELATED APPLICATIONS

The present application claims the benefit of priority under 35 U.S.C. § 120 as a continuation of U.S. patent application Ser. No. 18/503,555, titled "Data Processing Using Application Sequence Identifiers in Cloud Environments," filed Nov. 7, 2023, which is incorporated by reference in its entirety.

TECHNICAL FIELD

This application generally relates to data processing. In particular, the present application relates to processing a dataset by multiple servers in a cloud environment.

BACKGROUND

In a computer networked environment, multiple servers hosting multiple applications can process a dataset by processing multiple instances of the same dataset. Multiple instances of the same dataset can lead to inconsistencies in the dataset across the multiple servers. Applications on each server can perform functions on instances of the same dataset, producing changes to each instance of the dataset which can be computationally complex to catalogue and further process. Furthermore, a data processing system can experience increased latency by delays generated due to sequencing of the dataset for processing by each of the servers in an attempt to retrieve an updated dataset.

SUMMARY

In processing the data, one or more services (e.g., on a cloud network) may transfer a dataset to one or more applications to perform a function on the dataset. Each application may generate or modify the dataset while performing the function. The modified dataset (or second dataset) may be used by another application or generated by the other application from a second instance of the dataset. In this manner, the modified dataset can be produced by multiple applications while performing their respective functions. This repetition and redundancy in the creation of the modified dataset can cause unnecessary delay, latency, and wasted computational power. For example, multiple instances of a first dataset can be processed by multiple applications to produce a second dataset during the performance of functions for each of the applications. The second dataset can thereby exist in multiple instances, further adding to the complexity of instances of the dataset and further wasting computational resources.

Additionally, delays due to data dependency can be common in this setup. For example, a first application may produce a second dataset not produced by a second application. The second application may process the second dataset upon completion of the first application data processing the first dataset, although the second dataset was produced sooner than the completion of the data processing by the first application. Due to redundancy in data processing and delays caused by data dependency, this approach may be ineffective at processing a dataset across multiple servers and applications. All of these issues may be exacerbated when the data processing is on a cloud platform, in which a multiple of services and applications are accessible for invocation. Without any interfacing among the services and applications in this environment, separate workflows may be defined to process overlapping or even same data, resulting in the increase of redundant storage and unnecessary delay and latency in processing the data.

To address these and other technical challenges, a service can generate a set of flow identifiers to define a sequence of processing a dataset. Each flow identifier can indicate an application in the sequence for the dataset to carry out a function. For example, a first flow identifier can indicate a first application as a predecessor for processing the dataset according to a function and a second flow identifier can indicate a second application as a successor for processing the dataset according to the function. The predecessor can indicate the origin of the dataset and the successor can indicate the next application to which the dataset should be communicated. The service can further generate flow identifiers for processing the dataset beyond the second application. For instance, the service can generate a third flow identifier indicating the second application as the predecessor for a second dataset generated by the second application and a fourth flow identifier indicating a third application as a successor for the second dataset. In this way, a flow of processing the dataset can be generated and executed to enable a streamlined processing of the dataset for a function of an application. Furthermore, the service can maintain a repository of datasets associated with the function accessible by a multitude of applications to enable the processing of multiple datasets according to multiple functions. The service can also maintain configuration files provided by an administrator to specify generation of flow identifiers for particular functions and applications.

When a first dataset is received by the service from a first application, the service may store the first dataset in a cloud repository. The service may mark the first dataset as eligible for flow sequence processing. The first dataset may be passed (in whole or in part) to a second application for performance of a function associated with the first application. The service can identify the second application based on flow identifiers defining a sequence of processing the first dataset. The second application can generate a second dataset, which can thereby be stored in the cloud repository by the service. The second dataset can likewise be communicated to the first application, or a third application, for processing the second dataset according to the function. The successor application for the second dataset can be determined by a generated flow identifier of the sequence indicating the successor application.

Using the flow identifiers, the service can define a sequence for processing the dataset associated with the function. The service can communicate the dataset and any other datasets generated during the performance of the function to applications identified as successors. The service can receive the dataset and any other datasets generated during the performance of the function from applications identified as predecessors. By using the flow identifiers, the function can be performed more quickly than calling another instance of the dataset. For example, second or subsequent datasets generated from the first dataset can be communicated to the service. The service can generate flow identifiers for the subsequent datasets and relay the subsequent datasets to the corresponding successor applications based on the flow identifiers. Furthermore, the service can enable bidirectional data processing, such as the subsequent applications can include the first application. For example, a third dataset generated by a third application can correspond to a flow identifier indicating the first application as the successor application. This processing enables the subsequent datasets to be available for performance of the function while a first dataset is undergoing processing.

In this manner, the service can provide for sequential data processing based on generated flow identifiers for the dataset indicating applications associated with the performance of the function. These flow identifiers can indicate a predecessor application for a first dataset and a successor application for the first dataset and the service can communicate the first dataset based on these flow identifiers defining the sequence for the first dataset. The flow identifiers can indicate further applications for the processing of the first dataset according to the function. Furthermore, the service can generate a second set of flow identifiers for a second dataset generated by an application associated with the function. The ability to sequence and maintain the dataset during the performance of the function reduces the overall latency of the data processing system while ensuring that a most recent or updated dataset is available by the service.

Aspects of the present disclosure are directed to systems, methods, and non-transitory computer readable media for handling processing of data in cloud environments. A server may include at least one processor coupled with memory. A first server may host a first application of a set of applications. The server may receive, from the first server, a first dataset generated in response to a function of the first application. The server may generate, responsive to receipt of the first dataset, a set of identifiers. The set of identifiers may define a sequence of processing of the first dataset associated with the function among one or more of the set of applications in a cloud environment. The set of identifiers may include (i) a first identifier indicating the first application as a predecessor for the first dataset and (ii) a second identifier indicating a second application of the set of applications as a successor for the first dataset. The server may identify the second application corresponding to the second identifier as the successor for processing the first dataset. The server may communicate at least a portion of the first dataset with a second server hosting the second application to receive a second dataset generated by the second application. The server may store, on a data storage of the cloud environment, the second dataset received from the second server hosting the second application in the cloud environment.

In some embodiments, the server may determine, responsive to storing the second dataset, that the sequence of processes identifies a third application of the set of applications for the function of the first application. The server may generate, responsive to determining that the sequence identifies the third application, (i) a third identifier indicating the second application as a predecessor for the second dataset and a (ii) a fourth identifier indicating the third application as a successor to process the second dataset.

In some embodiments, the server may determine, responsive to storing the second dataset, that the sequence of processing identifies the second application as a terminal application for the function. The server may refrain, responsive to determining that the sequence of processing identifies the second application as the terminal application, from generating additional identifiers for the processing of the second dataset.

In some embodiments, the server may access the data storage of the cloud environment to identify the first dataset as eligible for flow sequence processing among one or more of the set of applications. Generating the set of identifiers may include generating the set of identifiers defining the sequence of processing for the first dataset, responsive to identifying the first dataset as eligible for flow sequence processing.

In some embodiments, the server may receive, from an administrator device, a configuration instruction to define the sequence of processing of the first dataset associated with the function among one or more of the set of applications in the cloud environment for the generation of the set of identifiers. In some embodiments, the server may identify, based on the function of the first application used to generate the first dataset, a flow sequence from a set of flow sequences. Each of the set of flow sequences may define a corresponding sequence of processing of datasets associated with a respective function. Generating the set of identifiers may include generating the set of identifiers defining the sequence of processing of the first dataset in accordance with the flow sequence identified for the function of the first application.

In some embodiments, identifying the second application may include identifying the second application corresponding to one of an upstream application or a downstream application relative to the first application corresponding to the first identifier. In some embodiments, communicating at least the portion of the first dataset may include sending at least the portion of the first dataset to the second server in the cloud network to invoke a second function of the second application.

In some embodiments, storing the second dataset may include combining, on the data storage in the cloud environment, the first dataset with the second dataset generated from at least the portion of the first dataset. In some embodiments, the server can provide, via a dashboard interface for presentation, information associated with the set of identifiers and the sequence of processing of the first dataset among one or more of the set of applications in the cloud environment.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and, together with the specification, explain the subject matter of the disclosure.

DETAILED DESCRIPTION

Figure 1:
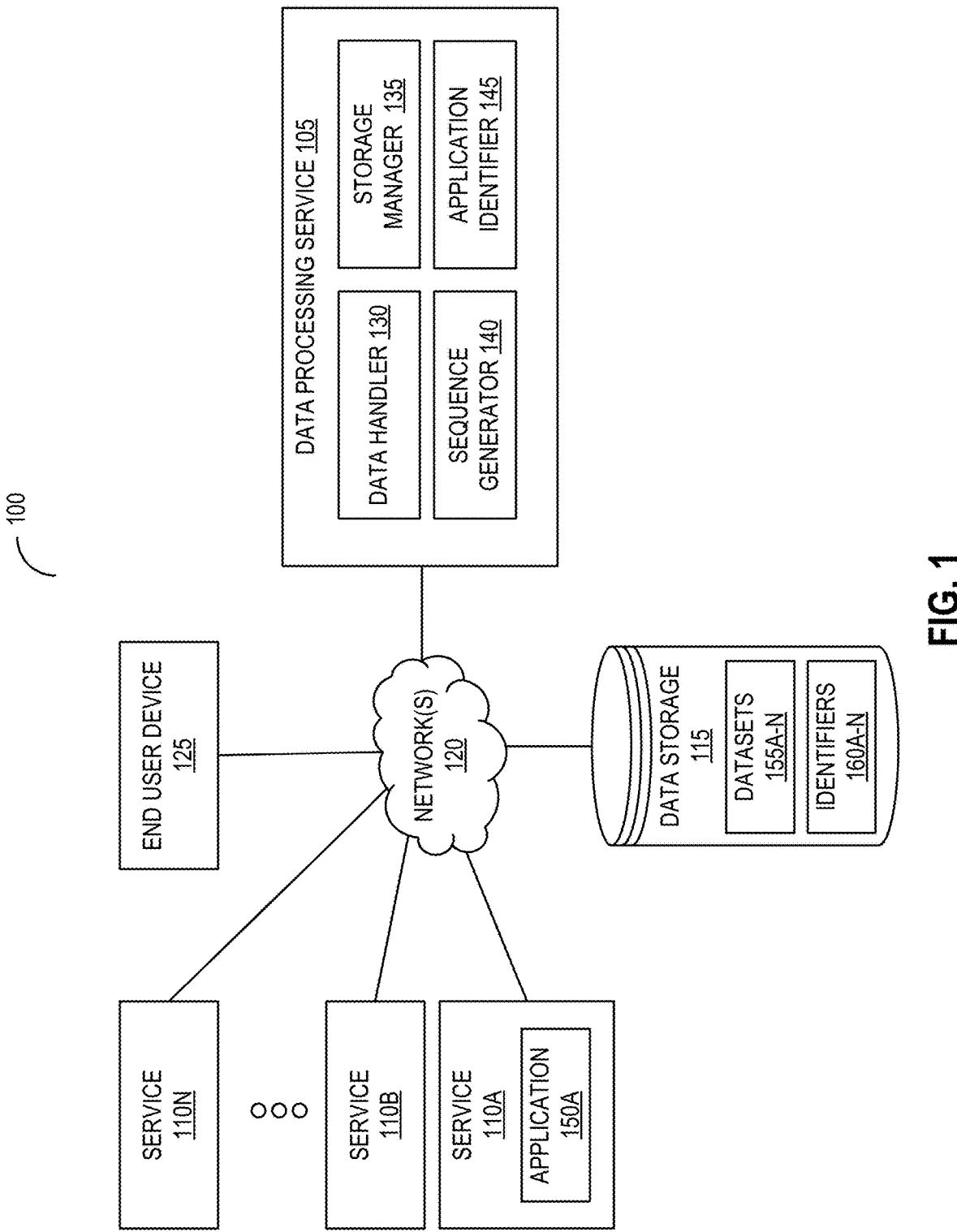
FIG. 1 illustrates a block diagram of an example system for handling processing of data in a cloud environment in accordance with an embodiment.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

Disclosed herein are systems and methods for handling processing of data in cloud environments. A service can receive a first dataset, from a first server hosting a first application of a set of applications. The first dataset can be generated in response to a function of the first application. The service can generate identifiers that define a sequence of processing of the first dataset. The identifiers can indicate one or more applications from the set of applications as a predecessor or a successor for the first dataset. Based on a second identifier indicating a second application as a successor, the server can identify the second application and communicate at least a portion of the first dataset with a second server hosting the second application. The second application can provide a second dataset. Upon receiving the second dataset, the service can store the second dataset in the cloud environment.

FIG. 1 depicts a block diagram of an example system 100 for handling processing of data in a cloud environment access to services. The system 100 may include one or more services 110A-N (hereinafter generally referred to as the service(s) 110), at least one data processing service 105, at least one end user device 125, and a data storage 115, coupled with one another via at least one network 120. The data storage 115 may include at least datasets 155A-N (hereinafter generally referred to as the dataset(s) 155) or at least identifiers 160A-N (hereinafter generally referred to as the identifier(s) 160), accessible by any or all components of the system 100. The services 110 may include at least one application 150A-N (hereinafter generally referred to as the application(s) 150) The data processing service 105 may include at least one data handler 130, at least one storage manager 135, at least one sequence generator 140, or at least one application identifier 145, among others.

Embodiments may comprise additional or alternative components or omit certain components from those of FIG. 1 and still fall within the scope of this disclosure. For example, the data storage 115 and the data processing service 105 may be part of the same device. Various hardware and software components of one or more public or private networks 120 may interconnect the various components of the system 100. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. The network 120 may include a cloud network or cloud environment. A cloud network or environment can be or include any of the networks described herein to allow the services 110 or the data processing service 105, among other components of the system 100, to access each other without the need for direct connection or communication from each component. The cloud network 120 can enable the ability for information of the system 100 (such as the datasets 155 or the identifiers 160, among others) to be accessible by any component of the system 100. For example, the cloud network 120 can include the data storage 115 such that the data storage 115 is accessible by the various components of the system 100, such as the services 110.

The cloud network 120 may also include a cloud-based delivery, e.g. Software as a Service (SaaS), Platform as a Service (PaaS), and Infrastructure as a Service (IaaS). IaaS may refer to a user renting the use of infrastructure resources that are needed during a specified time period. IaaS providers may offer storage, networking, servers or virtualization resources from large pools, allowing the users to quickly scale up by accessing more resources as needed. PaaS providers may offer functionality provided by IaaS, including, e.g., storage, networking, servers or virtualization, as well as additional resources such as, e.g., the operating system, middleware, or runtime resources. SaaS providers may offer the resources that PaaS provides, including storage, networking, servers, virtualization, operating system, middleware, or runtime resources. In some embodiments, SaaS providers may offer additional resources including, e.g., data and application resources.

Each service 110 may be any computing device hosting resources to be configured by the data processing service 105 via the network 120. The services 110 may be a set of independent systems which may perform a function through the one or more applications 150 for the end user device 125. The services 110 can be or include cloud services, such that the services 110 operate on or through the cloud network 120. The services 110 can each perform a function for the end user device 125 independently of the other services 110. The function may be a transaction type. The function or transaction type may be initiated on a scheduled basis, or responsive to a request, such as a request from the end user device 125 to access the services 110. The services 110 may host the one or more applications 150 (e.g., native or web application) in the cloud network 120.

The applications 150 may include one or more applications hosted on the cloud network 120, the services 110, or a combination thereof, to perform one or more functions on the dataset 155. The applications 150 may be executed, stored, or operated on the cloud network 120 by the services 110. One or more of the applications 150 may perform a function. For example, a first application 150A hosted by a first service 110A can perform a first portion of a function and a second application 150B hosted by the first service 110A or a second service 110B can perform a second portion of the function. The function can provide or be related to a transaction initiated by the end user device 125, such as opening a bank account, performing a background check, or opening a credit card account, among others.

The end user device 125 may be any computing device operable by a user or automatic to submit the request to access one or more services 110. The end user device 125 may submit the request to access the one or more services 110 as a part of initiating the transaction. For example, the end user device 125 may submit a request to initiate or continue opening a bank account through the services 110. The end user device 125 may include any number of computing devices and may be in communication with the services 110, the data storage 115, or the data processing service 105, among others via the network 120. The end user device can include a virtual machine operable on the cloud network 120. The end user device 125 may submit one or more requests to perform a transaction type with one or more services 110. The end user device 125 may provide information related to a data flow processing for functions performed by the applications 150. For example, the end user device 125 can provide the dataset 155 or the identifiers 160 to the data processing service 105.

The data processing service 105 may be any computing device including one or more processors coupled with memory (e.g., the data storage 115) and software and capable of performing the various processes and tasks described herein. The data processing service 105 may be in communication with the services 110, the network 120, the end user device 125, or the data storage 115. Although shown as a single data processing service 105, the data processing service 105 may include any number of computing devices. The data processing service 105 may receive or retrieve the dataset 155 from the end user device 125 or one or more of the services 110, via the network 120. The data processing service 105 may generate the identifiers 160 to define a sequence of processing the datasets 155 by the services 110.

The data processing service 105 includes several subsystems to perform the operations described herein. Within the data processing service 105, the data handler 130 receives and transmits the datasets 155 from the one or more services 110. The storage manager 135 stores the datasets 155 in the data storage 115 and tags the datasets as eligible for flow sequence processing. The sequence generator 140 generates the identifiers 160 based on at least the application 150, the services 110, the datasets 155, or a combination thereof to define a sequence of processing the datasets 155 by the applications 150. The application identifier 145 identifies one or more applications of the applications 150 as a successor for processing the datasets 155.

Figure 2:
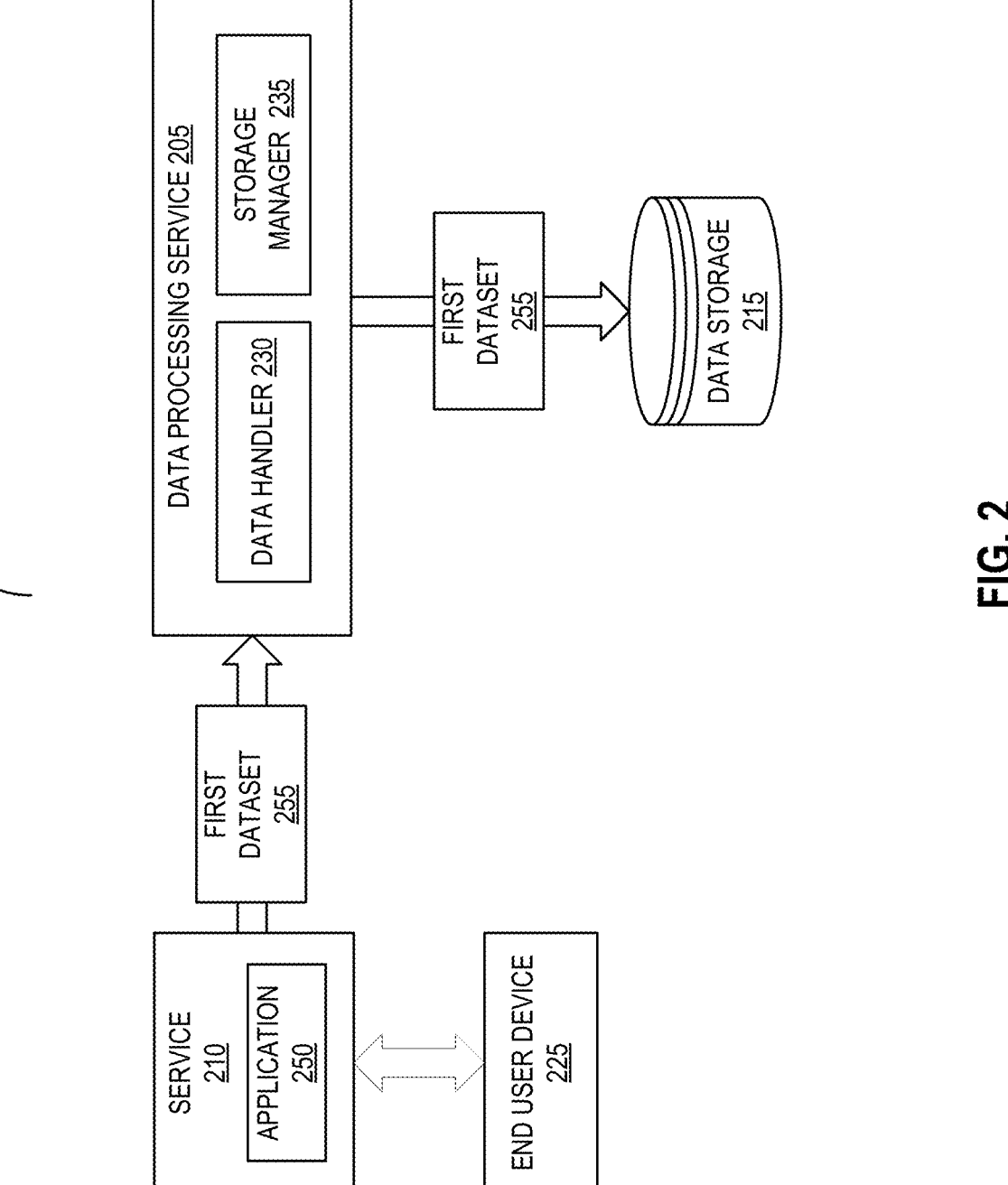
FIG. 2 illustrates a block diagram of an example system for receiving a first dataset in response to a function of a first application in accordance with an embodiment.

FIG. 2 depicts a block diagram of a system 200 for receiving a first dataset in response to a function of a first application. The system 200 may include a data processing service 205, a service 210, a first dataset 255, an end user device 225, or a data storage 215. The data processing service 205 may include a data handler 230, or a storage manager 235, among others. The data handler 230 may receive, from the service 210, the first dataset 255. The service 210 can include an application 250 to generate the first dataset 255 in response to a function of the application 250. The storage manager 235 may store any received datasets in the data storage 215 and may tag and identify tagged dataset within the data storage 215 as eligible for flow sequence processing.

Embodiments may comprise additional or alternative components or omit certain components from those of FIG. 2 and still fall within the scope of this disclosure. Various hardware and software components of one or more public or private networks may interconnect the various components of the system 200. Each component in system 200 (such as the service 210, or the data processing service 205) may be any computing device comprising one or more processors coupled with memory and software, and capable of performing the various processes and tasks described herein.

The data processing service 205 includes a data handler 230, among others. The data handler 230 receives, transmits, or otherwise communicates at least a portion of the first dataset 255 or other datasets to the service 210. The data handler 230 can receive the first dataset 255 via the cloud network, such as transmitted by the service 210 and transmitted over the cloud network to the data handler 230. The service 210 may generate the first dataset 255 by a function of the application 250 to transmit to the data handler 230. The application 250 can perform a function as a result of user input, receipt of a dataset, according to a schedule, or upon aggregating a threshold amount of data to comprise a dataset. For example, the application 250 may aggregate data regarding errors, access, latency times, user information, among others. Upon the aggregation of a threshold amount of information, the application 250 may execute the function using the aggregated dataset. The application 250 can perform the function upon receipt of a dataset. For example, the application 250 may receive a dataset from the data processing service 205, another application, or user input, among others, and may initiate the function which generates the first dataset 255.

The end user device 225 may initiate the generation of the first dataset 255 by the function of the application 250. The end user device 225 can submit a request to perform a transaction. The transaction can include opening a bank account, performing a background check, opening a credit line, requesting a loan, requesting a refinance, purchasing insurance, trading investments, transferring funds, or making a purchase, among others. The function can provide or be related to the transaction initiated by the end user device 225. For example, submitting the request to perform the transaction can include or cause initiation of the function to generate the first dataset 255. The end user device 225 may provide information or a dataset to the application 250 to generate the first dataset 255 via the function of the application 250.

The first dataset 255 may define, identify, or otherwise include information generated, identified, or otherwise determined by the application 250. The first dataset 255 can include information relating to a transaction, a user initiating the transaction, or parameters for the transaction, among others. For example, the first dataset 255 can include information relating to a name, title, phone number, email address, physical address (such as a home, work, or school), salary information, credit history information, banking information (e.g., a request loan amount or a bank account number), identification number, a data range, or a transaction type (e.g., loan request, bank account opening, background check, among others) among others. The first dataset 255 may include information related to the first dataset 255, such as an identifier, timestamps indicating receipt or transmission, a listing of applications that may process the first dataset 255, an application processing history of the first dataset 255, previous iterations of the first dataset 255, or tags associated with the first dataset 255, among others.

As an illustrative example, a user operating the end user device 225 may initiate the generation of the first dataset 255 by providing input for the function of the application 250 to open a bank account. Opening a bank account can cause one or more functions of one or more applications to operate. For example, opening a bank account may include the functions related to checking an identify of the user operating the end user device 225, transferring funds of the user, or performing a credit check of the user, among others. A function, such as checking an identity of the user, can include one or more portions of the function. The application 250 can perform all of the portions of the function, or one or more applications can perform one or more portions of the function. For example, the application 250 may identify a name of the user as a first portion of the function to check the identity of the user, and a second application can perform a second portion of the function such as identifying an image of the user. Continuing with the illustrative example, the user may operate the end user device 225 to provide information related to the transaction of opening a bank account. The user may provide, for example, identifying information such as a name, social security number, address, phone number, email address, income, or profession, among others, to the application 250 as a part of the request to open a bank account. The application 250 may generate the first dataset 255 using at least the identifying information provided by the user. The application 250 may generate the first dataset 255 using additional information, such as globally sourced information related to opening a bank account, information about users with similar demographics to the user opening the bank account, a time of the request, information related to a location of the request (e.g., average income for the location, number of bank account holders in the location, among others), or other such information to generate the first dataset 255. The application 250 may use the information to provide to the function to generate the first dataset 255. For example, the application 250 may, responsive to the initiation of the transaction by the end user device 225, perform a function of checking the user's identity as a part of the transaction to open a bank account. Checking the identity may generate the first dataset 255 including information such as additional bank accounts associated with the user, a credit score of the user, other identifying information not provided by the user, or a verification of the user's identity, among others.

The data handler 230 may receive the first dataset 255 from the service 210. The data handler 230 may query the service 210 to obtain the first dataset 255. In some cases, the data handler 230 may cause the function of the application 250 to generate the first dataset 255 responsive to receiving a query for the first dataset 255. The data handler 230 may obtain or receive the first dataset 255 according to a schedule, such as every minute, every second, or at another frequency. The data handler 230 may receive the first dataset 255 upon generation of the first dataset 255 by the function of the application 250. The application 250 may transmit the first dataset 255 upon generation of the first dataset 255. The data handler 230 may receive or retrieve the first dataset 255 from the data storage 215. In some cases, the first dataset 255 may be stored in the data storage 215 upon generation of the first dataset 255 whereby the data handler 230 can retrieve the first dataset 255 from the data storage 215. The data handler 230 may retrieve the first dataset 255 from the data storage 215 responsive to an indication from the storage manager 235 identifying the first dataset as eligible for flow sequence processing.

The storage manager 235 stores, manages, or otherwise maintains the first dataset 255 in the data storage 215. The data storage 215 may be any combination of hardware and software to store information, such as the first dataset 255. The first dataset 255 may be maintained using one or more data structures, such as an array, a linked list, a tree, a graph, or a hash table, among others. The first dataset 255 may be stored on the data storage 215 in the form of one or more script files, such as extensible markup language (XML), Java Script Object (JSON), or initialization (INI) files, among others. The storage manager 235 may update, change, or store the first dataset 255 in the data storage 215. The storage manager 235 may manage or maintain the first dataset 255 in response to a change in the first dataset 255 received from one or more services (e.g., the service 210). For example, the function of the service 210 can generate, modify, or otherwise change the first dataset 255. The storage manager 235 can store the modified first dataset 255 in the data storage 215 in the data structure of the first dataset 255.

In storing the first dataset 255, the storage manager 235 may determine whether the first dataset 255 is eligible for flow sequence processing. The storage manager 235 may determine whether the first dataset 255 is eligible for flow sequence processing based on an indication received from the application 250 indicating that the first dataset 255 is eligible. The storage manager 235 may determine whether the first dataset 255 is eligible for flow sequence processing based on the function or transaction associated with the first dataset 255. For example, a transaction associated with opening a bank account may be eligible for flow sequence processing. In some cases, an admin device can provide input to the data processing service 205 to identify transactions, functions, applications, or datasets which may be eligible for flow sequence processing or associated with a dataset which is eligible for flow sequence processing.

Flow sequence processing can refer to an ordered operation or processing of a dataset by one or more applications according to a defined sequence for processing the dataset. Flow data processing can include the systems and methods described herein to generate identifiers indicating applications for processing datasets according to a sequence defined by the identifiers. Flow data processing can utilize the first dataset 255 as an output from a first application, such as the application 250, to provide as input to a second application. In this manner, flow sequence processing can enable a timely and accurate transmittal of datasets between different applications in a cloud environment, thereby reducing latency, lead time, and computational power used when compared to systems maintaining multiple instances of the same dataset.

In storing the first dataset 255, the storage manager 235 may tag, mark, or otherwise label the first dataset 255. The storage manager 235 may label the first dataset 255 prior to storage of the first dataset 255 in the data storage 215 or upon storing the first dataset 255 in the data storage 215. The storage manager 235 may add a label to the data structure of the first dataset 255. The storage manager 235 may label the first dataset 255 to indicate a time of retrieval or receipt of the first dataset 255, a size or type of the first dataset 255, a transaction or function associated with the first dataset 255, a client device (e.g., the end user device 225) associated with the first dataset 255, among others. The storage manager 235 may label the first dataset 255 to indicate that the first dataset 255 is or is not eligible for flow sequence processing.

Figure 3:
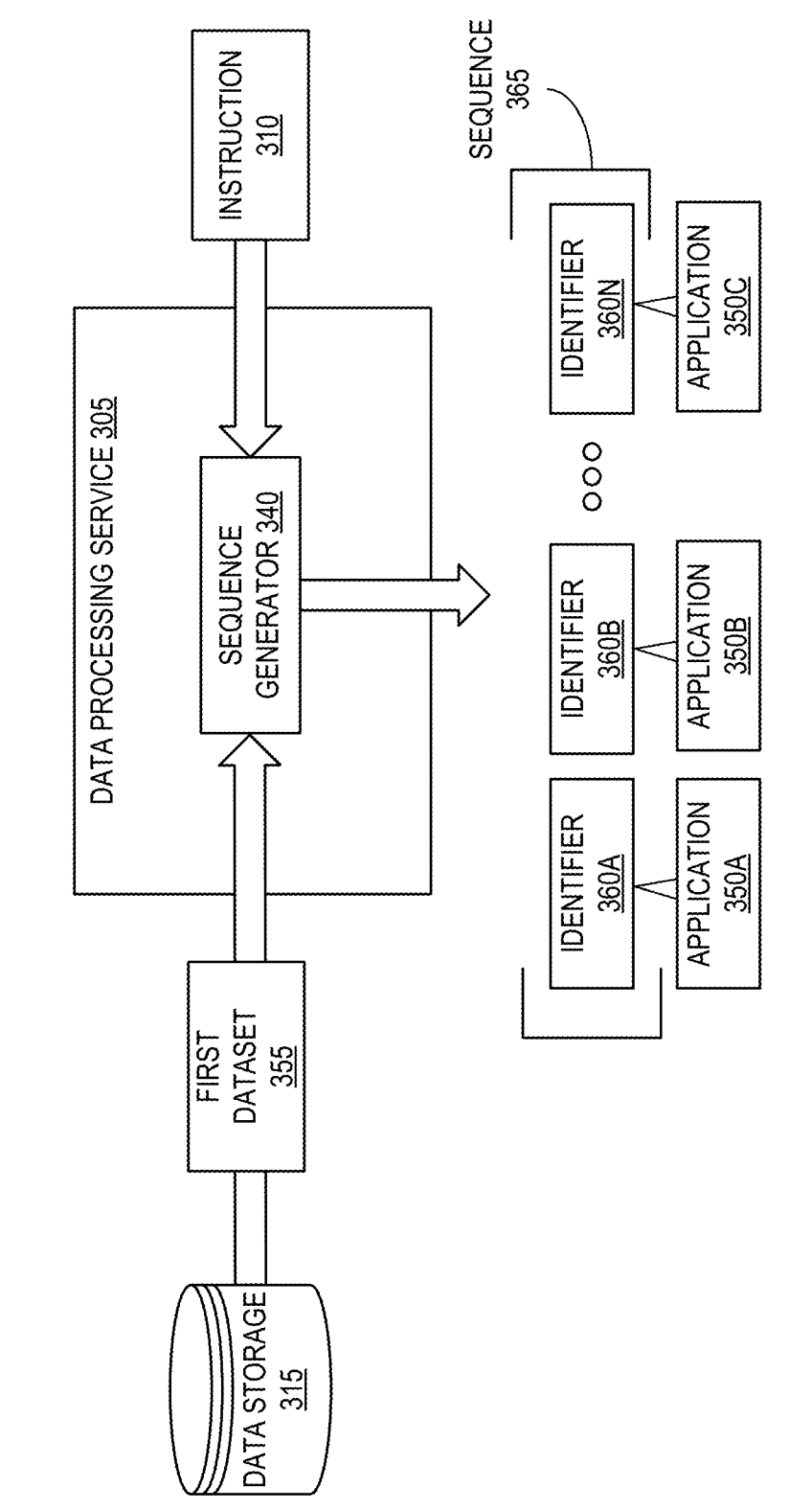
FIG. 3 illustrates a block diagram of an example system for generating identifiers defining a sequence of processing of the first dataset in accordance with an embodiment.

FIG. 3 depicts a block diagram of a system 300 for generating identifiers defining a sequence of processing of the first dataset. The system 300 may include an instruction 310, a data storage 315, data processing service 305, applications 350A-N, or a sequence 365 defined by identifiers 360A-N, among others. The data processing service 305 may include at least a sequence generator 340. Embodiments may comprise additional or alternative components or omit certain components from those of FIG. 3 and still fall within the scope of this disclosure. Various hardware and software components of one or more public or private networks may interconnect the various components of the system 300. Each component in system 300 (such as the data processing service 305 or the applications 350A-N) may be any computing device comprising one or more processors coupled with memory and software and capable of performing the various processes and tasks described herein.

In conjunction with the receipt of one or more datasets, the data processing service 305 may generate one or more identifiers 360A-N (hereinafter generally referred to as the identifier(s) 360) defining a sequence of processing a dataset associated with a function of one or more of the applications 350A-N (hereinafter generally referred to as the application(s) 350). The identifiers 360 can indicate one or more applications 350 as having an ordered or sequential position in a flow sequence 365. The flow sequence 365 (also referred to herein as the sequence 365) can be defined by the generated identifiers 360. For example, a first identifier 360A can indicate a first application 350A as a third position in the sequence 365 and a second application 350B as a fourth position in the sequence 365, wherein the dataset would be sequentially processed by the second application 350B associated with the fourth position after the first application 350A associated with the third position processes the dataset.

The identifiers 360 can be or include any number, hash, pattern, passcode, or other such identifier to associate the dataset with a position in the sequence 365 of processing of the dataset. The identifiers 360 may define a temporal position in the sequence 365, such that the identifiers 360 indicate one or more applications 350 to process the first dataset 355 prior to other of the one or more applications 350 processing the first dataset 355. The identifiers 360 may indicate a position of processing the first dataset 355 based on the applications 350 performing the function. For example, the identifiers 360 can be a listing of ordinal numbers such as first, second, third, etc. During performance of the function, the first dataset 355 may proceed sequentially through the ordered identifiers 360 to define the sequence 365 as a portion of the function is completed at each identifier 360.

The sequence generator 340 is any combination of hardware and software configured to configure, add, or delete one or more identifiers 360. The sequence generator 340 may generate the identifiers 360 according to one or more of user input, the function, the applications 350, or an identified flow sequence, among others. The sequence generator 340 can store the generated identifiers 360 in at least the data storage 315. The sequence generator 340 can store the generated identifiers 360 in associated with the first dataset 355.

The sequence generator 340 may generate the identifiers 360 based an instruction 310 (also referred to herein as the configuration instruction 310). The sequence generator 340 may receive the configuration instruction 310 from an administrator device to define the sequence 365 of processing of the first dataset 355. The sequence generator 340 may receive the configuration instruction 310 from the data processing service 305, an outside service or administrator of the data processing service 305, or from an external service. The configuration instruction 310 can include rules, instructions, or configurations to define the sequence 365, the identifiers 360, or a combination thereof based on: one or more of the function, the transaction, the application 350, the first dataset 355, or an end user device, among others. For example, the configuration instruction 310 can indicate that a dataset generated by a first application 350A is to be associated with the identifiers 360. For example, the configuration instruction 310 can define the sequence 365 for the identifiers 360. The configuration instruction 310 can define the sequence 365 for the identifiers according to an end user device associated with the first dataset 355, a transaction initiated by the end user device, or the applications 350, among others.

The configuration instruction 310 may define generation of additional identifiers 360, a change to one or more identifiers 360 or the sequence 365, or a deletion of one or more identifiers 360 or the sequence 365, among others. When instructed to change an existing identifier 360 or sequence 365, the configuration instruction 310 may define an update to the identifiers 360, the sequence 365, or a combination thereof. When instructed to add a new identifier 360, the configuration instruction 310 may define an application 350, a position of the sequence 365, or a transaction for the new identifier 360. When instructed to delete an existing identifier 360 or sequence 365, the configuration instruction 310 may identify which identifier(s) 360 is to be deleted. The sequence generator 340 can update the data storage 315 in accordance with the configuration instruction 310. The configuration instruction 310 may be created by an administrator to define the generation of the identifiers 365 for the sequence 365, for a given application or a function.

The sequence generator 340 may generate the set of identifiers 360 based on an identified flow sequence. One or more sequences 365 may be defined and stored within the cloud network, such as within the data storage 315. In some cases, the configuration instruction 310 can include the defined flow sequences. The sequence generator 340 can store the defined flow sequences in the data storage 315 upon receipt of the defined flow sequences. The sequence generator 340 may identify the sequence 365 of the one or more defined flow sequences stored in the data storage 315. The sequence generator 340 may identify the sequence 365 based on the function of the first application 350A. For example, the defined flow sequence may include the identifiers 360 according to the function of the first application 350A and the sequence generator 340 may identify a defined flow sequence corresponding to the function of the first application 350A or the first application 350A. In some cases, the identified defined flow sequence can be the sequence 365 for processing the first dataset 355 associated with the function of the first application 350A. The sequence generator 340 can generate the identifiers 360 in accordance with the identified defined flow sequence. For example, the identified defined flow sequence can indicate an ordinal set of the applications 350 for processing the first dataset 355 according to the function. The sequence generator 340 can generate the identifiers 360 according to the ordinal set of the applications 350 indicated by the identified defined flow sequence.

The identifiers 360 can define the sequence 365 for the first dataset 355. As the first dataset 355 is processed according to the sequence 365 defined by the identifiers 360, the sequence 365 can gain additional identifiers generated by the sequence generator 340. For example, the sequence generator 340 can continuously generate identifiers 360 for inclusion in the sequence as the first dataset 355 is processed by the one or more applications 350 to perform the function. The sequence generator 340 can append or insert the identifiers 360 to or within the sequence 365. The sequence generator 340 may modify the sequence with the additional identifiers responsive to the configuration instruction 310, or an output of one or more of the applications 350 while processing the first dataset 355.

The sequence generator 340 may generate the identifiers 360 based on the first dataset 355. The sequence generator 340 can identify, from the first dataset 355, an indication for how to next process the first dataset 355. For example, the first dataset 355 may indicate that a piece of information of the first dataset 355 was not determinable or retrievable. The sequence generator 340 can generate the identifiers 360 to indicate an application to further process the first dataset 355 to determine or retrieve the piece of information for the first dataset 355.

The sequence generator 340 may generate the identifiers 360 responsive to identifying the first dataset 355 as eligible for flow sequence processing. The storage manager can label, mark, or otherwise indicate that the first dataset 355 is eligible for flow sequence processing. The sequence generator 340 can identify the first dataset 355 within the data storage 315 as eligible for flow sequence processing by the indication provided by the storage manager. The sequence generator 340 can generate the identifiers 360 for the first dataset 355 responsive to identifying that the first dataset 355 is eligible for flow sequence processing based on the indication associated with the first dataset 355 from the storage manager.

The sequence generator 340 may store the identifiers 360 in the data storage 315. The sequence generator 340 may store the identifiers 360 in the data storage 315 as each identifier 360 is generated, as batches of generated identifiers 360, or on a schedule. The sequence generator 340 can store the identifiers 360 in the data storage 315 in association with the first dataset 355. For example, the first dataset 355 can be a data structure including the identifiers 360 for the first dataset 355. The sequence generator 340 can append, concatenate, or otherwise include the identifiers 360 for the first dataset 355 at any time, or responsive to a change in the first dataset 355.

Figure 4:
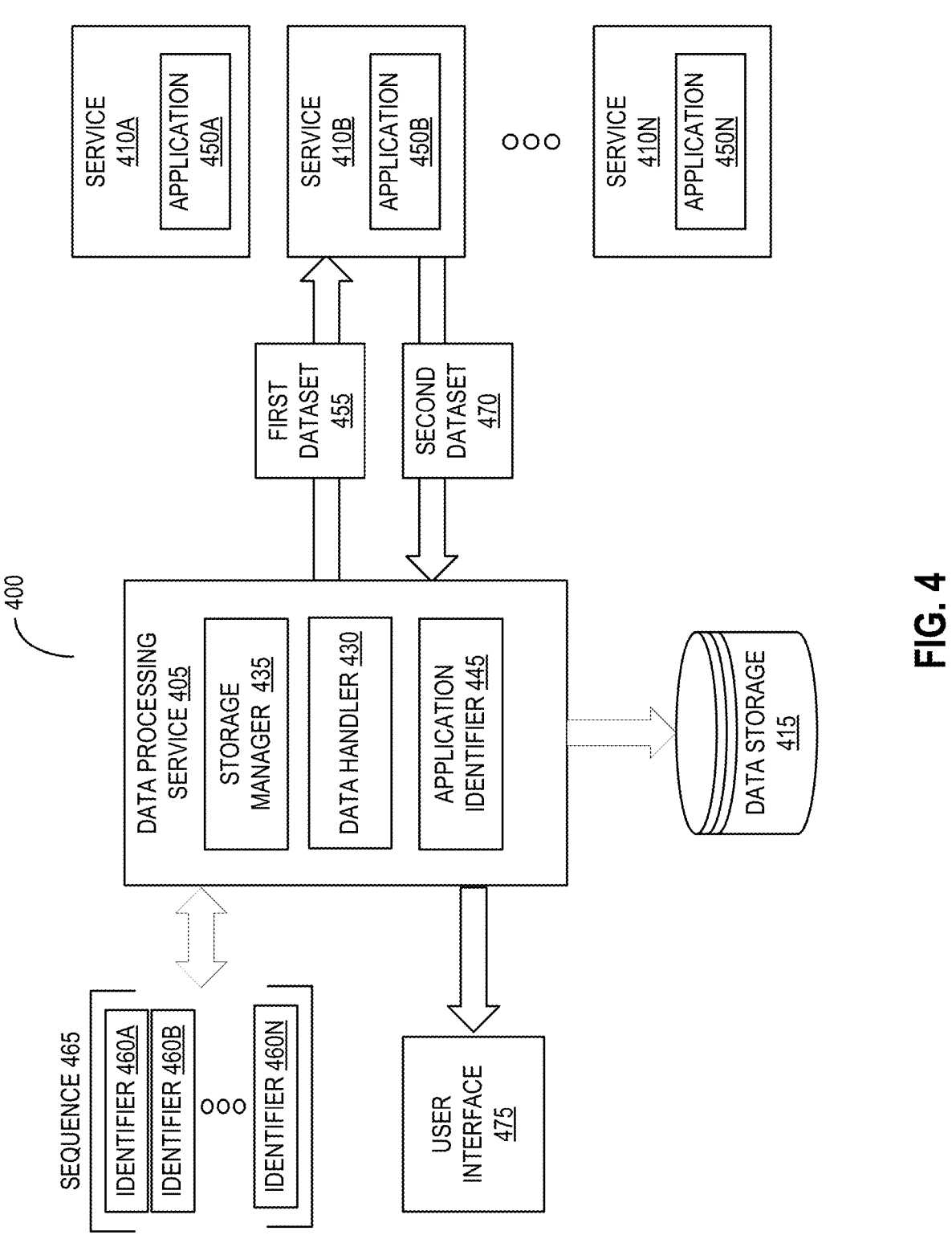
FIG. 4 illustrates a block diagram of an example system for identifying a second application hosted on a second server and communicating a portion of the first dataset to the second server to receive a second dataset and storing the second dataset in a cloud environment in accordance with an embodiment.

FIG. 4 depicts a block diagram of a system 400 for identifying a second application hosted on a second server, communicating a portion of the first dataset to the second server to receive a second dataset, and storing the second dataset in a cloud environment in accordance with an embodiment. The system 400 may include a data storage 415, services 410A-N hosting one or more applications 450A-N, a data processing service 405, a user interface 475, a sequence 465, one or more identifiers 460A-N, a first dataset 455, or a second dataset 470, among others. The data processing service 405 may include at least a data handler 430, a storage manager 435, or an application identifier 445, among others. Embodiments may comprise additional or alternative components or omit certain components from those of FIG. 4 and still fall within the scope of this disclosure. Various hardware and software components of one or more public or private networks may interconnect the various components of the system 400. Each component in system 400 (such as the service 410, or the data processing service 405) may be any computing device comprising one or more processors coupled with memory and software and capable of performing the various processes and tasks described herein.

With the generation of the identifiers 460 that define the sequence 465 of processing a dataset, the data processing service 405 may identify one or more of the applications 450A-N (hereinafter generally referred to as the application(s) 450) by the sequence 465 as a successor for processing the first dataset 455. The application identifier 445 may identify the application 450 as a second application, as a successor application, or both, for the first dataset 455. In some cases, each identifier 460 can indicate or be associated with an application of the applications 450. In this manner, the identifiers 460 can define the sequence 465 to indicate an order of the applications 450 for processing the first dataset 455 for the function.

The application identifier 445 identifies the application 450 associated with the identifier 460. The application identifier can identify the application 450 as a successor or a predecessor for the dataset 455. For example, a first identifier 460A can indicate a first application 450A as a predecessor for the first dataset 455 and a second identifier 460B can indicate a second application 450B as a successor for the first dataset 455. Successor and predecessor can refer to relative positions within the sequence 465 indicating an order of the applications 450 to process the first dataset 455. In some cases, the predecessor has already processed the first dataset 455 for the function by the first application 450A and the successor is yet to process the first dataset 455 for the function by the second application 450B.

The predecessor can be located at a position less than or prior to the position of the successor. For example, a first application 450A can process a dataset at a first time and a second application 450B can process the dataset at a second time occurring later or after the first time. Continuing with this example, at a third time subsequent to the first time and prior to the second time, the first application 450A may be defined as the predecessor and the second application 450B may be defined as the successor. In some cases, the successor and the predecessor are directly subsequent, meaning that the position of the predecessor and the successor differs by one. For example, if the predecessor is at the third position of the sequence 345, the successor will be at the fourth position of the sequence 465. In some cases, the predecessor and the successor are one or more positions apart. For example, the sequence 465 can include one or more predecessors for a successor, or one or more successor for a predecessor.

The application identifier 445 may identify the second application 450 as an upstream application. An upstream application can include a successor application. The application identifier 445 can identify the application according to the generated identifier 460 indicating an upstream application to next process the first dataset 455. The application identifier 445 may identify the second application 450 as a downstream application. A downstream application can include a predecessor application. The application identifier 445 can identify the application according to the generated identifier 460 indicating a downstream application to next process the first dataset 455. In this manner, the application identifier 445 can identify applications 450 which have already processed the first dataset 455 to process the first dataset 455 again or subsequently, upon identifying an association between the first dataset 455, the identifier 460, and the application 450.

Upon identifying the application 450, the data handler 430 can communicate at least a portion of the first dataset 455 to a service 410 hosting the application 450. The data handler 430 can identify the portion based on the application 450 or the service 410. The data handler 430 can identify the portion to provide as input to the application 450 to further perform the function associated with the transaction. The portion can include all of the first dataset 455 or a subset of the first dataset 455, depending on inputs accepted by the application 450. In some cases, the data handler 430 can structure, modify, or otherwise change the first dataset 455 or the portion thereof for transfer to the application 450. For example, the data handler 430 may append null values, strings, or other information to the first dataset 455. For example, the data handler 430 may modify a file type associated with the first dataset 455 to conform to a file type accepted by the application 450.

The data handler 430 can identify the service 410 hosting the application 450 based on the application 450. The data handler 430 query the cloud network for the service 410 hosting, corresponding to, or associated with the identified application 450. For example, the service 410 may respond to a query soliciting the application 450 indicating that the service 410 hosts the application 450. The service 410 may provide an identification of itself, such as a MAC address, IP address, pointer, virtual machine associated with the service 410, among others. The data handler 430 can identify the service 410 by a directory mapping applications to services. For example, the data handler 430 can access, search, or retrieve from the directory the service 410 hosting the application 450 based on the application 450. The data handler 430 can transmit the first dataset 455 or at least a portion thereof via the cloud network to the identified service 410 for the application 450 to process the first dataset 455 or the portion thereof.

The application 450 may process the first dataset 455 or the portion thereof received from the data handler 430. Processing the first dataset 455 may modify the first dataset 455. In some cases, the data handler 430 may not transmit to another application or allow another application to modify or process the first dataset 455 while the application 450 is processing the first dataset 455 or the portion thereof. In some cases, if the application 450 is processing a portion of the first dataset 455, the data handler 430 may transmit a separate portion of the first dataset 455 to another application. Upon completion of processing the first dataset 455, the application 450 may transmit the first dataset 455 to the data handler 430, or the data handler 430 may retrieve the first dataset 455.

The application 450 may generate a second dataset 470. The application 450 may generate the second dataset 470 by the function associated with a first application, or the application 450 may generate the second dataset 470 by a second function of the application 450. For example, in processing the first dataset 455 or the portion thereof, the application 450 may generate a modified first dataset 455, a second dataset 470, or both. In some cases, the second dataset 470 can be or include the modified first dataset 455. In some cases, the application 450 can perform a part of the function associated with the first application, perform a part or all of a second function associated with the application 450, or both.

The data handler 430 may receive the second dataset 470 from the application 450. In some cases, the second dataset 470 can include the first dataset 455 or a modified first dataset 455. In some cases, the second dataset 470 may not correspond to or relate to the first dataset 455. Upon receipt of the second dataset 470 from the application 450 by the data handler 430, the storage manager 435 may store the second dataset 470. The storage manager 435 may store the second dataset 470 in the data storage 415. Storing the second dataset 470 in the data storage 415 can include storing the second dataset 470 in a cloud-based environment, such as the cloud network. The storage manager 435 may mark, label, or otherwise annotate the second dataset 470 as eligible for flow sequence processing.

The storage manager 435 may store the second dataset 470 in conjunction with, combination with, or association with the first dataset 455. The storage manager 435 may aggregate, amalgamate, or otherwise combine the first dataset 455 with the second dataset 470 on the data storage 415 in the cloud environment. For example, the storage manager 435 may add the second dataset 470 to the data structure of the first dataset 455 stored in the data storage 415. The storage manager 435 may associate a timestamp, function, or application with the storage of the second dataset 470 in conjunction with the first dataset 455. The storage manager 435 may combine the second dataset 470 with the first dataset 455 by identifying differences between the first dataset 455 and the second dataset 470 and updating, appending, or adding information of the second dataset 470 that differs from information of the first dataset 455. For example, the first dataset 455 may be updated or added to responsive to the receipt of the second dataset 470.

Upon storage of the second dataset 470, the application identifier 445 may identify the application 450 as a terminal application for the function. The terminal application for the function can refer to or include a last application indicated in the sequence 465. For example, if the application identifier 145 identifies a third application 450C as the terminal application, the first dataset 455 associated with the function or another dataset associated with the function is not passed to a further application upon completion of processing by the third application 450C. In some cases, the identifier 460 can indicate an application as the terminal application. Processing a dataset by the function through the terminal application can indicate the completion of the function. Receiving a dataset from the terminal application can indicate the completion of the function.

If the application 450 is a terminal application for the function, the data processing service 405 may refrain from generating additional identifiers for the processing of the second dataset. For example, the receipt of the second dataset 470 can indicate the completion of the function if the application 450 is identified as the terminal application. The sequence generator may refrain from generating additional identifiers for the second dataset 470 upon the application identifier 445 identifying that the application 450 is a terminal application. In this manner, the lack of further identifiers can indicate that the performance of the function is complete.

Additionally or alternatively, the application identifier 445 may identify a third application for the function of the first application. For example, a third application 450C may not be identified as a terminal application. The third application 450C may be indicated by an identifier of the identifiers 460 defining the sequence 465 of processing the first dataset 455. The data handler 430 may communicate at least a portion of the first dataset 455, the second dataset 470, or a combination thereof to the third application 450B hosted by a third service 410C to perform the function of the first application. In some cases, upon identifying the third application 450C for the function of the first application, the sequence generator can generate additional identifiers to define the sequence 465. For example, the sequence generator can generate a third identifier 460C that indicates a second application 450B as a predecessor for the second dataset 470. For example, the sequence generator can generate a fourth identifier 460D that indicates the third application 450C as a successor to process the second dataset 470. In this manner, the generation of identifiers and the passing of the generated datasets to the applications 450 and the data storage 415 can be continued until the completion of the function.

The data handler 430 may generate instructions for presentation of information associated with the identifiers 460 and the sequence 465 on a user interface 475. The user interface 475 can include or be presented on a display device such as a touchscreen (e.g., of a smart phone, television, desktop computer, etc.), liquid-crystal display (LCD) screen, light-emitting diode (LED) screen, or other such screen. The user interface 475 can include one or more input devices to accept input regarding the information displayed through the user interface 475. For example, the user interface 475 can accept user input via a touchscreen, mouse, keyboard, or button, among others. The user interface 475 may display one or more user interface (UI) elements to display the information or to accept input via a touchscreen display device.

The data handler 430 can generate the instructions to include the one or more user interface elements to present the information associated with the identifiers 460 and the sequence 465. For example, the data handler 430 can generate the instructions to cause the display device to present the user interface 475 in a variety of colors, fonts, shapes, animations, icons, images, graphs, or other such presentations. The instructions can include instructions to generate sound or haptics in associated with the information associated with the identifiers 460 and the sequence 465. For example, the instructions can cause the display device to vibrate upon the receipt of a dataset. For example, the instructions can cause the display device to play a tone, song, whistle, or other such sound upon an identification of a dataset as eligible for flow sequence processing.

The information associated with the identifiers 460 and the sequence 465 can include information about one or more of the identifiers 460, the sequence 465, the data processing service 405, any datasets (e.g., the first dataset 455 or the second dataset 470, among others), the applications 450, or the data storage 415. For example, the user interface 475 can display a listing of the applications 450 associated with the identifiers 460 in the sequence 465. The user interface 475 can display a table depicting a position of the sequence 465 of the dataset at current or previous time. For example, the user interface 475 can display which application is currently processing the dataset, which application is the successor, or which application is the predecessor. The user interface 475 can display datasets identified as eligible for flow sequence processing. For example, the user interface 475 can display the listing of the applications 450 associated with tags indicating whether each application is or is not eligible for flow sequence processing. The user interface 475 can display a presentation of a level of completion of a function, such as the function associated with the first application. For example, the user interface 475 may display a percentage bar indicating how many applications 450 have performed a portion of the function, how many datasets of a total number of datasets have been received, among others.

In this manner, the data processing service can provide for sequential data processing in a cloud network environment by generating flow identifiers for the dataset defining a sequence of applications to be used to process data. The set of flow identifiers can indicate a predecessor application for a first dataset and a successor application for the first dataset and the service can communicate the first dataset based on these flow identifiers defining the sequence for the first dataset. The sequence of flow identifiers can provide improve the capability of processing data, by streamlining processing of the datasets to carry out the specified function. As a result, this can reduce redundancies of storage of data as well as decrease overall latency of the data processing system while ensuring that a most recent or updated dataset is available by the service.

Figure 5:
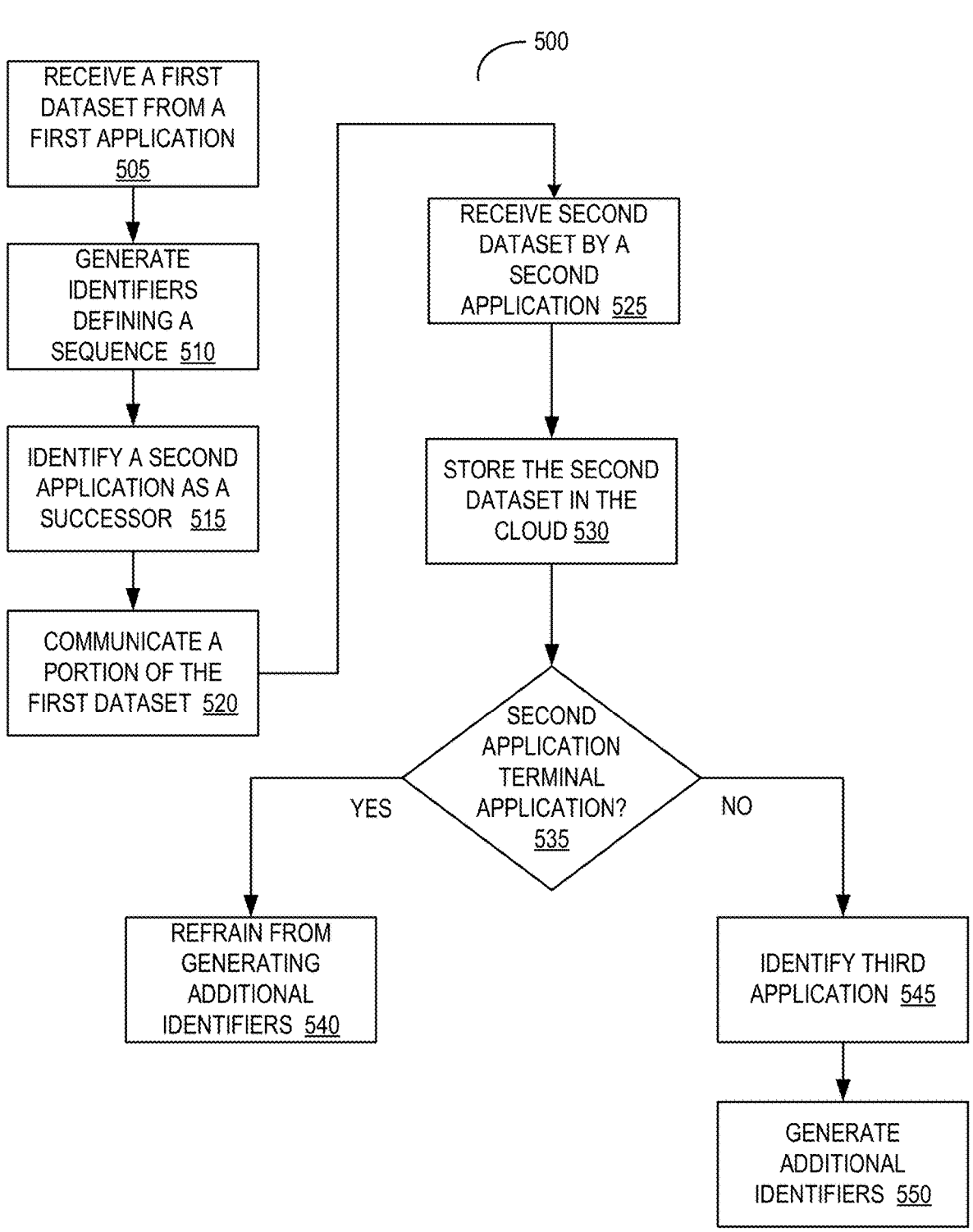
FIG. 5 illustrates a flow diagram of an example method of handling processing of data in a cloud environment in accordance with an embodiment.

FIG. 5 depicts a flow diagram of a method 500 for handling processing of data in a cloud environment. The method 500 may be implemented or performed using any of the components detailed herein. Embodiments may include additional, fewer, or different operations from those described in the method 500. The method 500 may be performed by a server executing machine-readable software code to provide one or more virtual machines in a cloud environment, though it should be appreciated that the various operations may be performed by one or more computing devices and/or processors. At step 505, the server receives a first dataset from a first application. The server can receive the first dataset from one or more applications hosted by one or more other servers. The server can receive the first dataset in a cloud environment from the one or more applications including the first application configured to operate in the cloud environment. In some cases, the first dataset can be generated by the first application as a part of a function associated with the first application.

At step 510, the server generates identifiers defining a sequence. The server can generate identifiers defining a sequence of processing the first dataset. In some cases, each identifier can indicate or be associated with an application of the one or more applications to perform the function associated with the first application. The server can generate the identifiers responsive to receiving the first dataset. The server can generate the identifiers responsive to a determination that the first dataset is eligible for flow sequence processing. The server can generate the identifiers to indicate an ordinal sequence of processing the first dataset in association with performance of the function associated with the first application.

At step 515, the server identifies a second application as a successor. The server can identify the second application as a successor to the first application for the dataset. In some cases, the server can identify the first application as the predecessor for the first dataset. The service can identify the second application as the successor based at least on the identifiers generated by the service. At step 520, the server communicates a portion of the first dataset. The server can communicate at least a portion of the first dataset to the identified successor. For example, the server can transmit the first dataset or a portion thereof to the second application identified as the successor for the first dataset.

At step 525, the server receives a second dataset by the second application. The second application can generate a second dataset using the first dataset. In some cases, the second application can generate the second dataset using the first dataset by using the first dataset as input for performing the function associated with the first application. The second dataset can include or be related to the first dataset. In some cases, the second dataset can be generated by the second application using a second function associated with the second application. The second application can transmit the second dataset to the server, or the server can retrieve the second dataset from the second application.

At step 530, the server stores the second dataset in the cloud. The server can store the second dataset in a data storage on or associated with a cloud environment, such as the cloud network. The server can store the second dataset with tags denoting whether the second dataset is eligible for flow sequence processing. The server can store the second dataset associated with a time stamp, contents of the dataset, or in association with another dataset. For example, in storing the second dataset, the server can combine the first dataset and the second dataset. Combining the first dataset and the second dataset can refer to or include the server storing the second dataset in association or as a part of the data structure of the first dataset. For example, the server may store the second dataset in a table of values for the first dataset. For example, the server may append the second dataset to the first dataset. For example, the server may generate a has including the first dataset and the second dataset.

At decision block 535, the server determines if the second application is a terminal application. The terminal application can be the last or final application for performing the function associated with the first application. For example, the function can be performed by a series of applications, such as one, two, three, or more applications. Each of the applications of the series can perform a portion of the function. The terminal application can be the last application of the series which concludes or completes the performance of the function. If the server determines that the second application is the terminal application, the server can proceed to step 540.

At step 540, the server refrains from generating additional identifiers. The server can refrain from generating additional identifiers responsive to determining that the second application is the terminal application. The server may refrain from generating additional identifiers because the server may not identify another application of the sequence if the second application is the terminal application. In this manner, the completion of the function can cause the server to refrain from generating additional identifiers. If the server determines that the second application is not the terminal application, the server may proceed to step 545.

At step 545, the server identifies a third application. The server may identify a third application responsive to the server determining that the second application is not the terminal application. The server can identify the third application to perform at least a portion of the first function associated with the first application. Identifying the third application can include identifying a server hosting the third application.

Upon identifying the third application, the server can generate additional identifiers (step 550). Generating additional identifiers can include generating a third identifier or a fourth identifier. The third identifier can include or identify the second application as the predecessor application for the second dataset. The fourth identifier can include or identify the third application as the successor application for the second dataset. In some implementations, the identifies can define a sequence of processing of the second dataset. In some implementations, the identifiers can define or add to the sequence of processing of the first dataset. For example, the third and fourth identifiers can be appended to or included within the sequence of processing of the first dataset. The sequence of processing of the first dataset can include the sequence of processing of the second dataset. In this manner, the first dataset can be processed by the applications according to the sequence for processing the first dataset throughout the performance of the function associated with the first application.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then" and "next," among others, are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, among others, may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:

identifying, by a service, a plurality of identifiers defined in accordance with a sequence of processing of datasets associated one or more of a plurality of applications in a cloud environment, the plurality of identifiers comprising at least a first identifier corresponding to a first application;

communicating, by the service, at least a portion of a first dataset with a first server hosting the first application of the plurality of applications corresponding to the first identifier identified in the sequence, to receive a second dataset generated by the first application;

determining, by the service, based on the second dataset, that a second application of the plurality of applications is to process the second dataset;

responsive to determining that the second application is to process the second dataset, modifying, by the service, the plurality of identifiers for the sequence to include (i) a second identifier indicating the first application as a predecessor for the second dataset and (ii) a third identifier indicating the second application as a successor to process the second dataset; and causing, by the service, a second server to execute the second application using the second dataset in accordance with the third identifier of the plurality of identifiers for the sequence.

2. The method of claim 1, further comprising:

receiving, by the service, from a remote device, an instruction defining a configuration of the sequence of processing of the datasets via one or more of the plurality of applications in a cloud environment; and modifying, by the service, in accordance with the configuration of the instruction, the sequence of processing the datasets by at least one of adding, deleting, or changing at least one of the plurality of identifiers.

3. The method of claim 2, wherein receiving the instruction further comprises receiving the instruction defining the configuration of the sequence of processing the datasets based on at least one of: (i) a function, (ii) a transaction type, (iii) at least one of the plurality of applications, (iv) datasets, or (v) a user device.

4. The method of claim 1, further comprising:

determining, by the service, responsive to receiving a third dataset from a second server hosting the second application, that the sequence of processing does not identify the second application as a terminal application; and identifying, by the service, from the plurality of identifiers, a fourth identifier indicating the second server as the predecessor for the third dataset, responsive to determining that the sequence of processing does not identify the second application as the terminal application.

5. The method of claim 1, further comprising:

determining, by the service, responsive to receiving a third dataset from a second server hosting the second application, that the sequence of processing identifies the second application as a terminal application; and refraining, by the service, from generating additional identifiers for the processing of the third dataset, responsive to determining that the sequence of processing identifies the second application as the terminal application.

6. The method of claim 1, wherein identifying the plurality of identifiers further comprises retrieving, from a data storage, the plurality of identifiers generated in response to receipt of a third dataset from a third server hosting a third application prior to the receipt of the first dataset.

7. The method of claim 1, wherein identifying the plurality of identifiers further comprises selecting, based on a function of the first application, the sequence of processing defining the plurality of identifiers from a plurality of sequences, each of the plurality of sequences defining a respective plurality of identifiers.

8. The method of claim 1, wherein communicating at least the portion with the first server further comprises sending at least the portion of the first dataset to the first server in the cloud environment to invoke the first application to generate the second dataset.

9. The method of claim 1, further comprising storing, by the service on a data storage of the cloud environment, an association between the first dataset communicated with the first server and the second dataset generated by the first server.

10. The method of claim 1, further comprising presenting, by the service, via a graphical user interface, information associated with the sequence of processing the first dataset associated with one or more of the plurality of applications in the cloud environment.

11. A system, comprising:

a service having one or more processors coupled with memory, the service configured to:

identify a plurality of identifiers defined in accordance with a sequence of processing of datasets associated with one or more of a plurality of applications in a cloud environment, the plurality of identifiers comprising at least a first identifier corresponding to a first application;

communicate at least a portion of a first dataset with a first server hosting the first application of the plurality of applications corresponding to the first identifier identified in the sequence, to receive a second dataset generated by the first application;

determine, based on the second dataset, that a second application of the plurality of applications is to process the second dataset;

responsive to determining that the second application is to process the second dataset, modify the plurality of identifiers for the sequence to include (i) a second identifier indicating the first application as a predecessor for the second dataset and (ii) a third identifier indicating the second application as a successor to process the second dataset; and cause a second server to execute the second application using the second dataset in accordance with the third identifier of the plurality of identifiers for the sequence.

12. The system of claim 11, wherein the service is further configured to:

receive, from a remote device, an instruction defining a configuration of the sequence of processing of the datasets via one or more of the plurality of applications in a cloud environment; and modify, in accordance with the configuration of the instruction, the sequence of processing the datasets by at least one of adding, deleting, or changing at least one of the plurality of identifiers.

13. The system of claim 12, wherein the instruction defines the configuration of the sequence of processing the datasets based on at least one of: (i) a function, (ii) a transaction type, (iii) at least one of the plurality of applications, (iv) datasets, or (v) a user device.

14. The system of claim 11, wherein the service is further configured to;

determine, responsive to receiving a third dataset from a second server hosting the second application, that the sequence of processing does not identify the second application as a terminal application; and identify, from the plurality of identifiers, a fourth identifier indicating the second server as the predecessor for the third dataset, responsive to determining that the sequence of processing does not identify the second application as the terminal application.

15. The system of claim 11, wherein the service is further configured to:

determine, responsive to receiving a third dataset from a second server hosting the second application, that the sequence of processing identifies the second application as a terminal application; and refrain from generating additional identifiers for the processing of the third dataset, responsive to determining that the sequence of processing identifies the second application as the terminal application.

16. The system of claim 11, wherein the service is further configured to retrieve, from a data storage, the plurality of identifiers generated in response to receipt of a third dataset from a third server hosting a third application prior to the receipt of the first dataset.

17. The system of claim 11, wherein the service is further configured to select, based on a function of the first application, the sequence of processing defining the plurality of identifiers from a plurality of sequences, each of the plurality of sequences defining a respective plurality of identifiers.

18. The system of claim 11, wherein the service is further configured to send at least the portion of the first dataset to the first server in the cloud environment to invoke the first application to generate the second dataset.

19. The system of claim 11, wherein the service is further configured to store, by the service on a data storage of the cloud environment, an association between the first dataset communicated with the first server and the second dataset generated by the first server.

20. The system of claim 11, wherein the service is further configured to present, via a graphical user interface, information associated with the sequence of processing the first dataset associated with one or more of the plurality of applications in the cloud environment.

* * * * *